United States Patent
Ramirez et al.

(10) Patent No.: US 12,274,940 B2
(45) Date of Patent: Apr. 15, 2025

(54) GAZE-BASED COORDINATION OF VIRTUAL EFFECTS INDICATORS

(71) Applicants: SONY INTERACTIVE ENTERTAINMENT LLC, San Mateo, CA (US); SONY INTERACTIVE ENTERTAINMENT INC., Tokyo (JP)

(72) Inventors: Kristie Ramirez, San Mateo, CA (US); Elizabeth Juenger, San Mateo, CA (US); Katie Egeland, San Mateo, CA (US); Sepideh Karimi, San Mateo, CA (US); Lachmin Singh, San Mateo, CA (US); Olga Rudi, San Mateo, CA (US)

(73) Assignees: Sony Interactive Entertainment LLC, San Mateo, CA (US); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/637,582

(22) Filed: Apr. 17, 2024

(65) Prior Publication Data
US 2024/0269559 A1     Aug. 15, 2024

Related U.S. Application Data

(63) Continuation of application No. 17/828,813, filed on May 31, 2022, now Pat. No. 11,975,264.

(51) Int. Cl.
*A63F 13/213* (2014.01)
*A63F 13/24* (2014.01)
(Continued)

(52) U.S. Cl.
CPC ........ *A63F 13/5375* (2014.09); *A63F 13/213* (2014.09); *G06F 3/013* (2013.01); *A63F 2300/1087* (2013.01); *A63F 2300/305* (2013.01)

(58) Field of Classification Search
CPC .............. A63F 13/213; A63F 13/5375; A63F 2300/305; A63F 2300/1087
See application file for complete search history.

(56) References Cited

U.S. PATENT DOCUMENTS

| 9,250,703 B2 * | 2/2016 | Hernandez-Abrego ..................... A63F 13/10 |
| 11,666,825 B2 | 6/2023 | Delamont |

(Continued)

FOREIGN PATENT DOCUMENTS

| CN | 117138339 A | 12/2023 |
| WO | WO 2023/235085 | 12/2023 |

OTHER PUBLICATIONS

Application No. PCT/US2023/020554, International Search Report and Written Opinion dated Jul. 17, 2023.
(Continued)

*Primary Examiner* — Omkar A Deodhar
*Assistant Examiner* — Shauna-Kay Hall
(74) *Attorney, Agent, or Firm* — Fish & Richardson P.C.

(57) ABSTRACT

A method and system for providing gaze-based generation of virtual effects indicators correlated with directional sounds is disclosed. Gaze data is tracked via a camera associated with a client device to identify a point of focus within a three-dimensional virtual environment towards which one or both eyes of the player are focused. When the point of focus indicated by the gaze data when the point of focus does not move towards the source location within the three-dimensional virtual environment when the directional sound is received indicates that a virtual effect indicator associated with the directional sound type of the indicated directional sound is should be generated.

21 Claims, 6 Drawing Sheets

(51) Int. Cl.
  *A63F 13/5375* (2014.01)
  *G06F 3/01* (2006.01)

(56) References Cited

U.S. PATENT DOCUMENTS

| | | | |
|---|---|---|---|
| 11,975,264 B2 | 5/2024 | Ramirez et al. | |
| 2011/0283865 A1 | 11/2011 | Collins | |
| 2013/0124204 A1* | 5/2013 | Wong | H04R 29/008 |
| | | | 704/235 |
| 2014/0368432 A1* | 12/2014 | Zhang | G06F 3/013 |
| | | | 345/158 |
| 2015/0082136 A1 | 3/2015 | Cameron et al. | |
| 2016/0080874 A1 | 3/2016 | Fullam | |
| 2016/0105757 A1* | 4/2016 | Vennström | G06F 3/167 |
| | | | 381/303 |
| 2016/0132289 A1 | 5/2016 | Vennstrom et al. | |
| 2019/0099660 A1* | 4/2019 | Nelson | A63F 3/00157 |
| 2021/0219086 A1 | 7/2021 | Osman | |
| 2023/0381651 A1 | 11/2023 | Ramirez et al. | |

OTHER PUBLICATIONS

U.S. Appl. No. 17/828,813 Office Action dated Sep. 7, 2023.
202310621591.3, Kristie Ramirez, Gaze-Based Coordination of Virtual Effects Indicators, May 30, 2023.
PCT/US2023/020554, Kristie Ramirez, Gaze-Based Coordination of Virtual Effects Indicators, May 1, 2023.

* cited by examiner

| Object | Events |
|---|---|
| Activity 216 | activityAvailabilityChange (id[])<br>activityStart (id,location)<br>activityEnd(id,outcome,location) |
| Zone 252 | locationChange (id,location) |
| Actor 254 | actorSelect (id[]) |
| Mechanic 256 | mechanicAvailabilityChange (id[])<br>mechanicInventoryChange (id[])<br>mechanicLoadoutChange (id[])<br>mechanicUse (id[],...)<br>mechanicImpact (id,...) |
| Game Media 258 | gameMediaUnlock (id)<br>gameMediaStart (id)<br>gameMediaEnd (id) |

FIG. 2B

GAZE-BASED COORDINATION OF VIRTUAL EFFECTS INDICATORS

CROSS-REFERENCE TO RELATED APPLICATION

This application is a continuation and claims the priority benefit of U.S. patent application Ser. No. 17/828,813 filed May 31, 2022, which is incorporated by reference herein in its entirety.

BACKGROUND OF THE INVENTION

1. Field of the Disclosure

The present technology pertains to detecting gaze to generate virtual effects indicators correlated with directional sounds. More specifically, the present technology may provide for dynamic generation of the virtual effects indicator during gameplay based on the detected gaze.

2. Description of the Related Art

Presently available interactive media titles, including virtual reality media titles, still face a wide range of accessibility issues pertaining to sensory disabilities such as blindness and low vision, hearing loss, deafness, deaf-blindness, and other sensory processing disorders. Advances in technology, driven, for example, by improving gameplay experiences for disabled players have resulted in a more inclusive environment, but there is still a lot of room for improvement.

In many interactive media titles, directional sound is used to convey incoming characters or action and are key to the storyline. Missing such directional sound due to sensory disabilities may result in a less-than-whole experience for some players.

Therefore, there is a need to provide a service that provides virtual effect indicators based on certain cues that the player is not hearing various directional sounds using gaze-based detection.

SUMMARY OF THE CLAIMED INVENTION

Aspects of the present disclosure include systems and methods for detecting gaze to generate virtual effects indicators correlated with directional sounds. Information regarding a plurality of directional sound types associated with one or more interactive content titles may be stored in memory. Each directional sound type may be associated with one or more virtual effects indicators in a respective interactive content title. Gameplay data sent over a communication network from a client device of a player engaged in a current activity of one of the interactive content titles within a current gameplay session may be monitored. The gameplay data may be indicative of a directional sound associated with a source location within a three-dimensional virtual environment of the interactive content title.

Gaze data may be tracked via a camera associated with the client device during the current gameplay session to identify a point of focus within the three-dimensional virtual environment towards which one or both eyes of the player are focused. When the point of focus indicated by the gaze data does not move towards the source location within the three-dimensional virtual environment when the gameplay data indicative of the directional sound is received, a virtual effect indicator associated with the directional sound type of the indicated directional sound may be generated to be presented within a display of the client device. The virtual effect indicator indicates the source location of the indicated directional sound.

Virtual effect indicators may include at least one of a visual doppler effect centered around the source location of the directional sound on the display, a written cue indicating which direction to look toward the source location, a visual indicator pointing to the source location of the directional sound or a direction of the directional sound, and a notification alerting the player to the source location of the directional sound. The gaze data may be mapped as the point of focus moves to a plurality of locations in the three-dimensional virtual environment. The point of focus indicated by the gaze data may be identified as not moving towards the source location within the three-dimensional virtual environment based on the mapped gaze data.

Identifying that the point of focus indicated by the gaze data does not move towards the source location within the three-dimensional virtual environment may further include comparing one or more three-dimensional coordinates associated with the source location of the directional sound with one or more three-dimensional coordinates associated with the determined point of focus. Alternatively or in addition to, identifying that the point of focus indicated by the gaze data does not move towards the source location within the three-dimensional virtual environment may include determining the orientation of the player within the three-dimensional virtual environment and determining a player field of vision that includes one or more three-dimensional coordinates of three-dimensional virtual environment based on the determined orientation. Other three-dimensional coordinates associated with the three-dimensional virtual environment may be excluded from the player field of vision.

Various aspects of the present disclosure may include methods of gaze-based generation of virtual effects indicators correlated with directional sounds. Such methods may include storing information regarding a plurality of directional sound types associated with one or more interactive content titles in memory, each directional sound type associated with one or more virtual effects indicators in a respective interactive content title. Such methods may include monitoring gameplay data sent over a communication network from a client device of a player engaged in a current activity of one of the interactive content titles within a current gameplay session, wherein the gameplay data is indicative of a directional sound associated with a source location within a three-dimensional virtual environment of the interactive content titles.

Such methods may include tracking gaze data via a camera associated with the client device during the current gameplay session to identify a point of focus within the three-dimensional virtual environment towards which one or both eyes of the player are focused. Such methods may include identifying that the point of focus indicated by the gaze data does not move towards the source location within the three-dimensional virtual environment when the gameplay data indicative of the directional sound is received. Such methods may include generating a virtual effect indicator associated with the directional sound type of the indicated directional sound to present within a display of the client device, wherein the virtual effect indicator indicates the source location of the indicated directional sound.

Additional aspects of the present disclosure may include systems for gaze-based generation of virtual effects indicators correlated with directional sounds. Such systems may include memory that stores information regarding a plurality of directional sound types associated with one or more interactive content titles in memory, each directional sound type associated with one or more virtual effects indicators in a respective interactive content title. Such system may include one or more processors that executes instructions stored in memory. Execution of the instructions by the one or more processors may monitor gameplay data sent over a communication network from a client device of a player engaged in a current activity of one of the interactive content titles within a current gameplay session, wherein the gameplay data is indicative of a directional sound associated with a source location within a three-dimensional virtual environment of the interactive content titles. Execution of the instructions by the one or more processors may track gaze data via a camera associated with the client device during the current gameplay session to identify a point of focus within the three-dimensional virtual environment towards which one or both eyes of the player are focused.

Execution of the instructions by the one or more processors may identify that the point of focus indicated by the gaze data does not move towards the source location within the three-dimensional virtual environment when the gameplay data indicative of the directional sound is received. The one or more object-object associations may dynamically generate the play data based on the one or more object-object associations to be displayed along with the media.

Execution of the instructions by the one or more processors may generate a virtual effect indicator associated with the directional sound type of the indicated directional sound to present within a display of the client device, wherein the virtual effect indicator indicates the source location of the indicated directional sound.

Further aspects of the present disclosure include non-transitory computer-readable medium or storage media having embodied thereon a program executable by a processor to provide a method for dynamic generation and display of play data for the media.

BRIEF DESCRIPTION OF THE DRAWINGS

FIG. 2B illustrates an exemplary table of various objects and associated events, according to an aspect of the present disclosure.

DETAILED DESCRIPTION

Aspects of the present disclosure include systems and methods for detecting gaze to generate virtual effects indicators correlated with directional sounds. Information regarding a plurality of directional sound types associated with one or more interactive content titles may be stored in memory. Each directional sound type may be associated with one or more virtual effects indicators in a respective interactive content title. Gameplay data sent over a communication network from a client device of a player engaged in a current activity of one of the interactive content titles within a current gameplay session may be monitored. The gameplay data may be indicative of a directional sound associated with a source location within a three-dimensional virtual environment of the interactive content title.

Figure 1:
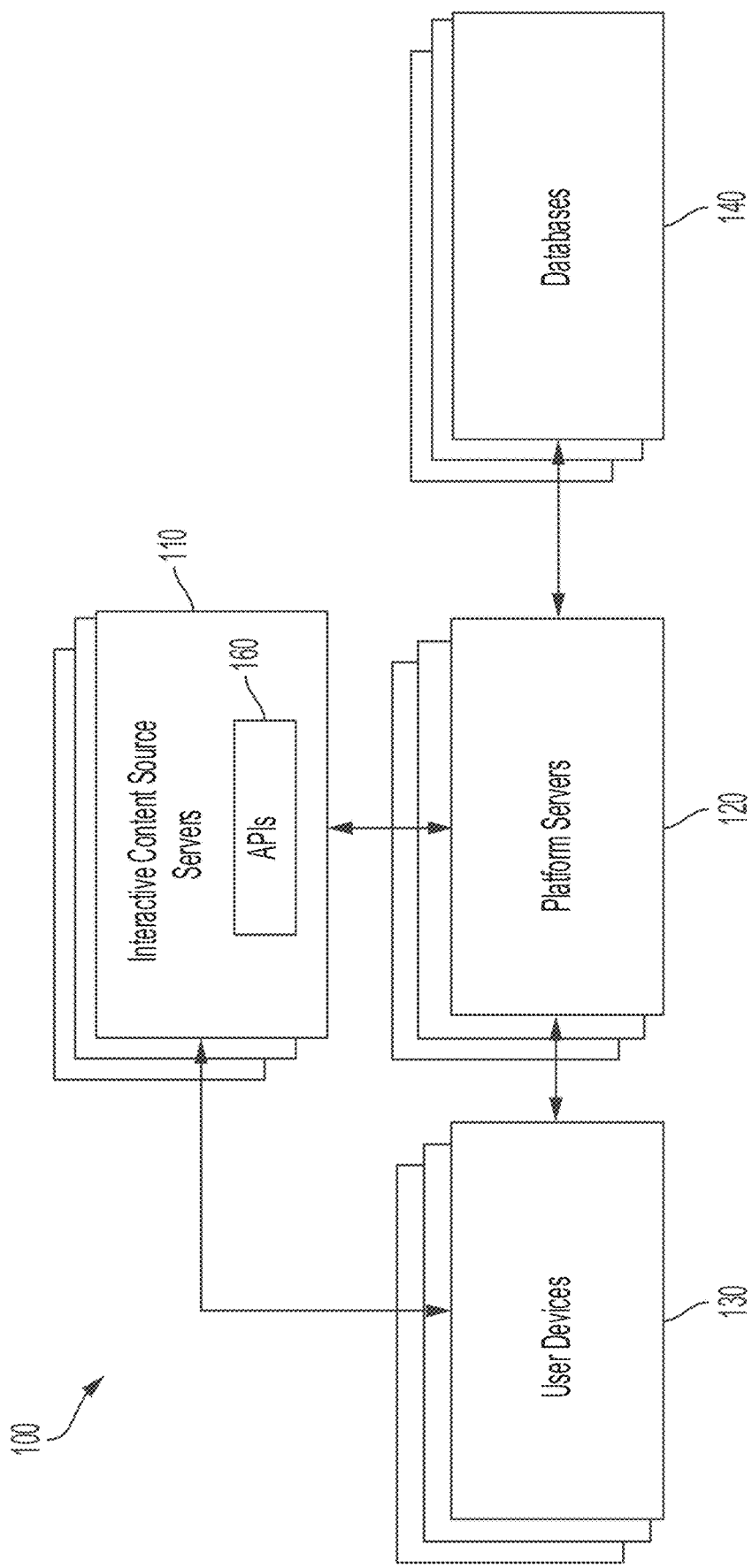
FIG. 1 illustrates an exemplary network environment in which a system for detecting gaze to generate virtual effects indicators correlated with directional sounds may be implemented.

FIG. 1 illustrates a network environment in which a system for detecting gaze to generate virtual effects indicators correlated with directional sounds may be implemented. The network environment 100 may include one or more interactive content servers 110 that provide streaming content (e.g., interactive video, podcasts, etc.), one or more platform servers 120, one or more user devices 130, and one or more databases 140.

Interactive content servers 110 may maintain, stream, and host interactive media available to stream on a user device 130 over a communication network. Such interactive content servers 110 may be implemented in the cloud (e.g., one or more cloud servers). Each media may include one or more sets of object data that may be available for participation with (e.g., viewing or interacting with an activity) by a user. Data about the object shown in the media may be stored by the media streaming servers 110, platform servers 120 and/or the user device 130, in an object file 216 ("object file"), as will be discussed in detail with respect to FIGS. 2A and 3.

The platform servers 120 may be responsible for communicating with the different interactive content servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example user device 130 is described in detail herein with respect to FIG. 6.

The databases 140 may be stored on the platform server 120, the media streaming servers 110, any of the servers 218 (shown in FIG. 2A), on the same server, on different servers, on a single server, across different servers, or on any of the user devices 130. Such databases 140 may store the streaming media and/or an associated set of object data. Such streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2A:
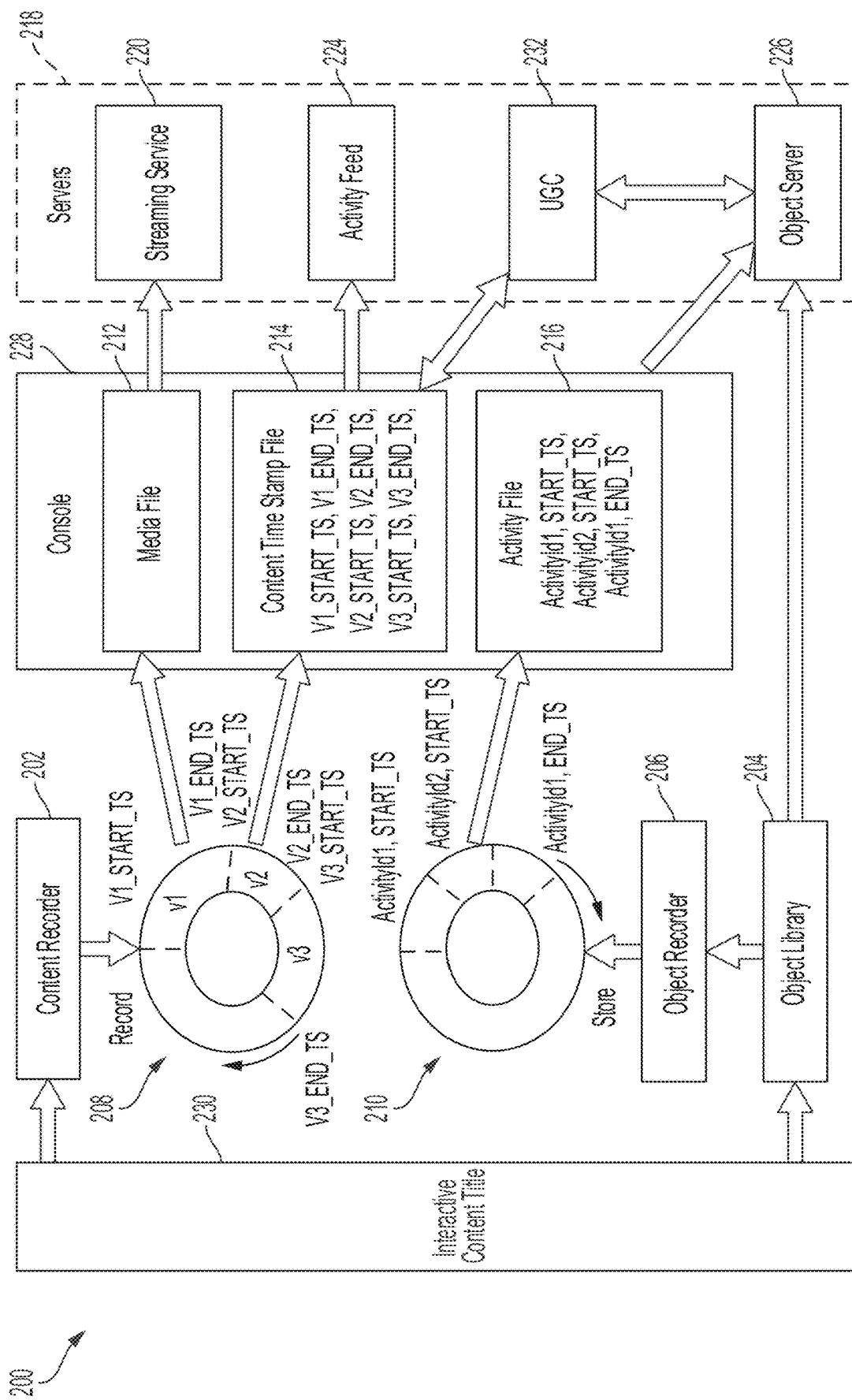
FIG. 2A illustrates an exemplary uniform data system (UDS) that may be used to provide data to a system for detecting gaze to generate virtual effects indicators correlated with directional sounds.

FIG. 2A illustrates an exemplary universal or uniform data system (UDS) that may be used to provide data to a system for detecting gaze to generate virtual effects indicators correlated with directional sounds. Based on data provided by UDS, platform server 120 can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2A, an exemplary console 228 (e.g., a user device 130) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

As shown in the example table 250 of FIG. 2B, such object data (e.g., the object file 216) may be associated with event information regarding activity availability change and may be related to other objects with associated object information. Media-object bindings may form telemetry between the objects shown in at least a portion of the live-streaming media and the live-streaming media. For example, such object data may be zone data files 252, actor data files 254, mechanics data files 256, game media data files 258, and other gameplay-related data files.

Such object data (e.g., the object file 216) may be categorized as in in progress, open-ended, or competitive. Such activity data files 216 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data files 216 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4×4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform server 120 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game, and can be player-controller or game-controlled, and can change dynamically during gameplay. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g, fire arrow, fire damage) or whether an initiator is the player, such that whether the mechanics were used by or against the player. Such mechanics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

Figure 3:
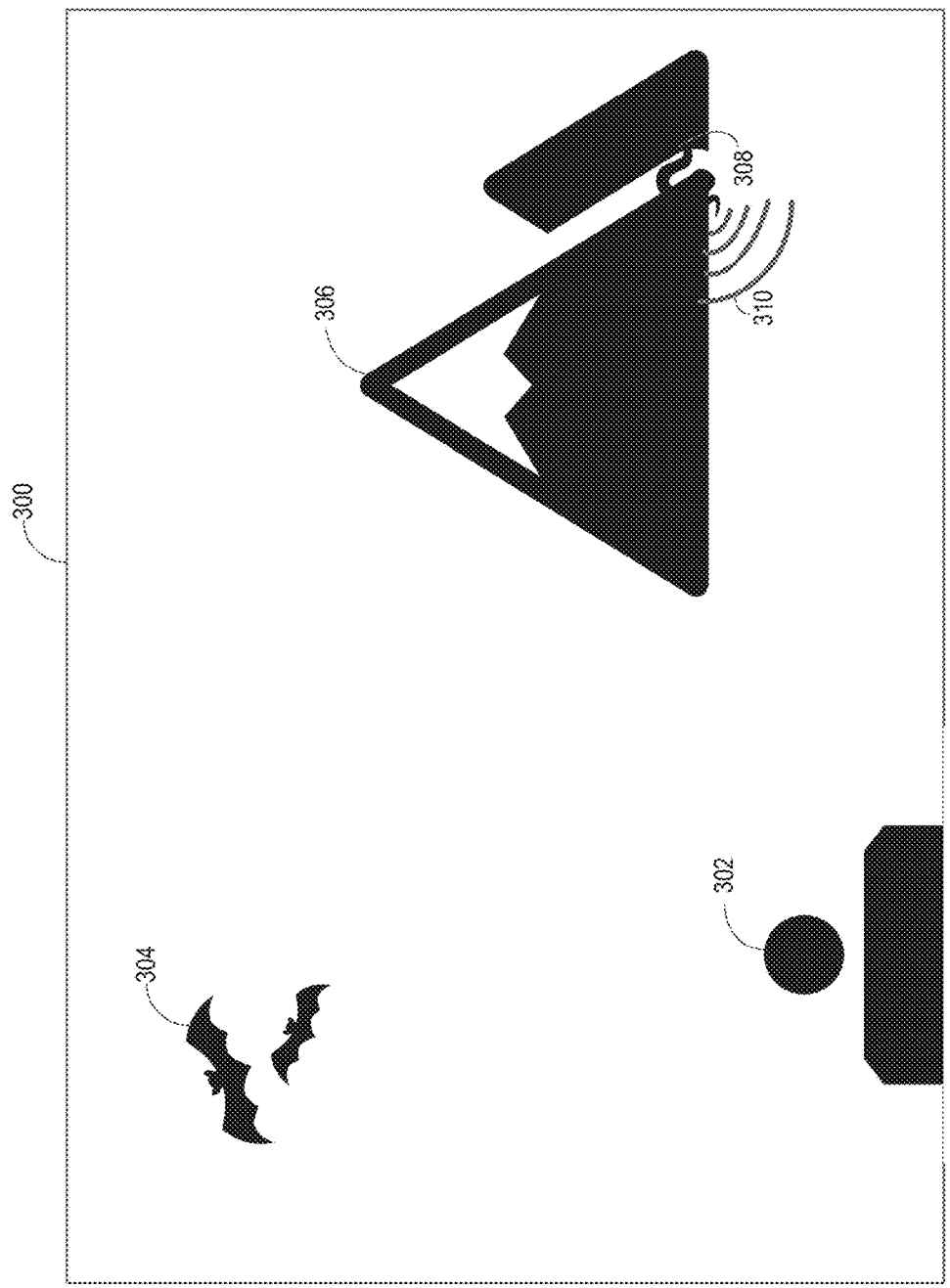
FIG. 3 illustrates an exemplary display with a generated virtual effect indicator.

FIG. 3 illustrates an example display with a generated virtual effect indicator. In a display 300 of a client device, an example third-person perspective of a player 302 in a gaming environment is shown. From the player's perspective, there are bats 304 flying on the left and a mountain 306 on the right. Hidden behind the mountains is a snake 308, which is hard to see at the moment. However, during gameplay, the sound of the snake 308 can be audibly heard and the directional sound is coming from the right side. In some examples, the sound is played louder from the right speaker or right side of a headset or other headphones.

When a player is hearing impaired, especially if they are hearing impaired in the right ear, the sound of the snake 308 may not be heard. In such a case, the player may still be looking at the bats 304, for example, since they are moving around. A camera (not shown) may be used to detect where the player is looking on the display 300. If it appears that during the playing of the sound of the snake 308, the player fails to gaze towards the right, it may be an indication that the player is hearing impaired in the right ear. In such a case, a virtual effect indicator 310 is generated to indicate where the sound is coming from.

As discussed in more detail below, the virtual effect indicator 310 may only be generated after a certain threshold of an extent of mismatch between a point of focus determined by the gaze data and the source location. For example, after failing to gaze towards the source location after 5 times, then the virtual effect indicator 310 is generated. Furthermore, the player may consistently look a certain degree away from where the source location is. In such a case, the player may have a certain percentage of hearing loss in one or both ears that causes an offset in hearing. Therefore, a correction angle may be determined based on gaze patterns and how far off the player is looking from the source location. Then, the correction angle can be applied to re-balance the sound dynamic between the two speakers or sides of a headset.

Figure 4:
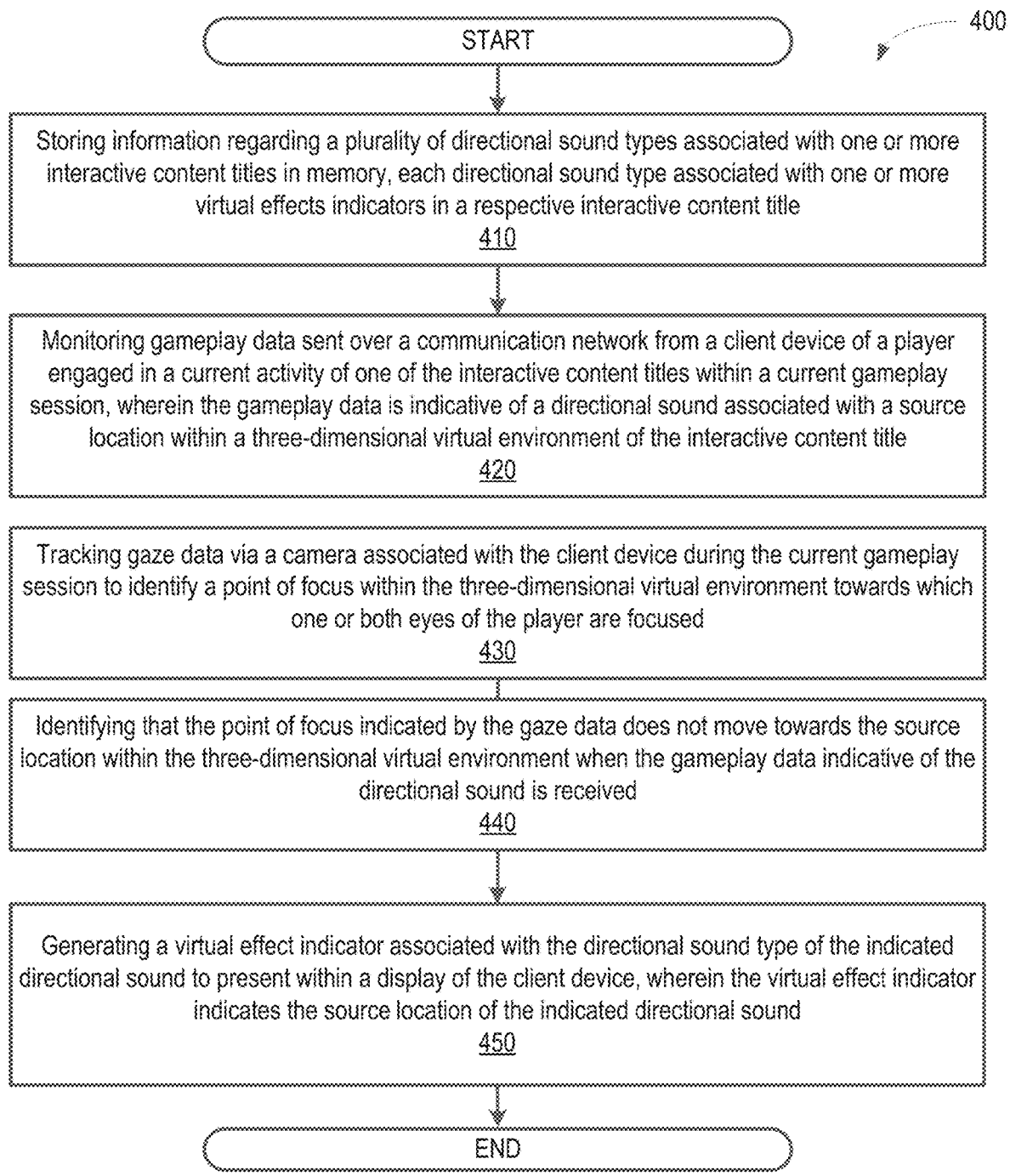
FIG. 4 illustrates a flowchart of an example method for detecting gaze to generate virtual effects indicators correlated with directional sounds, according to an aspect of the present disclosure.

FIG. 4 is a flowchart illustrating an example method 400 for detecting gaze to generate virtual effects indicators correlated with directional sounds. The method 400 of FIG. 4 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 4 are performed in the cloud). The steps identified in FIG. 4 (and the order thereof) are examples and may include various alternatives, equivalents, or derivations thereof including but not limited to the order of execution of the same.

In step 410, storing information regarding a plurality of directional sound types associated with one or more interactive content titles in memory. Each directional sound type is associated with one or more virtual effects indicators in a respective interactive content title. Directional sound types may vary in direction, kind of sound, and other sonic and location-based parameters. The directional sound types may later be recorded by the object recorder 206 in the activity file 216. A statistical analysis may be performed for which directional sound types are missed by players and can be proactively included in gameplay for known hearing-impaired players.

In step 420, monitoring gameplay data sent over a communication network from a client device of a player engaged in a current activity of one of the interactive content titles within a current gameplay session. During gameplay, the collected gameplay data may indicate a directional sound associated with a source location within a three-dimensional virtual environment of the interactive content title. For example, the source location may be in a display hidden behind another object or too far away to be seen but can be heard. The directional sound may be experienced as coming from a side that correlates to where the source location is on the display using directional audio technology.

In step 430, gaze data is tracked via a camera associated with the client device during the current gameplay session to identify a point of focus within the three-dimensional virtual environment towards which one or both eyes of the player are focused. The camera may be location on a virtual reality headset, a stand-alone camera set in front of the player, or on a console or on the display. The point of focus may be determined through various training and calibration modules that adjust a determined point of focus until the player has indicated that the determined point of focus is accurate. Alternatively, the calibration can be performed by internal measurements determined by a processor based on known factors.

In step 440, identifying that the point of focus indicated by the gaze data does not move towards the source location within the three-dimensional virtual environment when the gameplay data indicative of the directional sound is received. The identifying may include comparing one or more three-dimensional coordinates associated with the source location of the directional sound with one or more three-dimensional coordinates associated with the determined point of focus. The identifying may include determining an orientation of the player within the three-dimensional virtual environment, and determining a player field of vision that includes one or more three-dimensional coordinates of three-dimensional virtual environment based on the determined orientation, wherein other three-dimensional coordinates associated with the three-dimensional virtual environment are excluded from the player field of vision. The orientation may be determined based on a virtual reality headset that detects the orientation of the head or body of the player. Therefore, in virtual reality, it may be the case that the sound comes from a location outside of the field of vision and therefore would require the player to turn. In such a case, the virtual effect indicator may be an arrow or shading that indicates that the player should turn in a specific direction.

Furthermore, the gaze data may be mapped as the point of focus moves to a plurality of locations in the three-dimensional virtual environment. The point of focus indicated by the gaze data may be identified as failing to move towards the source location within the three-dimensional virtual environment as based on the mapped gaze data. Furthermore, a portion of the gaze data sharing a same set of timestamps as the identified trigger point may be identified as failing to match a location on a display in which the directional sound is coming from. A threshold may be set for an extent of mismatch between the point of focus and the source location of the source of the directional sound. The virtual effect indicator may be generated further based on the threshold being met.

In step 450, generating a virtual effect indicator associated with the directional sound type of the indicated directional sound to present within a display of the client device, wherein the virtual effect indicator indicates the source location of the indicated directional sound. The virtual effect indicator may be displayed close to where the source location is or describe where the source location is. Different virtual effect indicators may include visual doppler effect centered around the source location of the directional sound on the display, a written cue indicating which direction to look toward the source location, a visual indicating pointing to the source location of the directional sound or a direction of the directional sound, or a notification alerting the player to the source location of the directional sound. The virtual effect indicator may be generated as an overlay or as an object in the gaming environment. The virtual effect indicator may be recorded (or not) by the object recorder 206 and stored (or not) as an activity in the activity file. The virtual effect indicator may be shown or removed from the media file 212 in recording by the content recorder.

Figure 5:
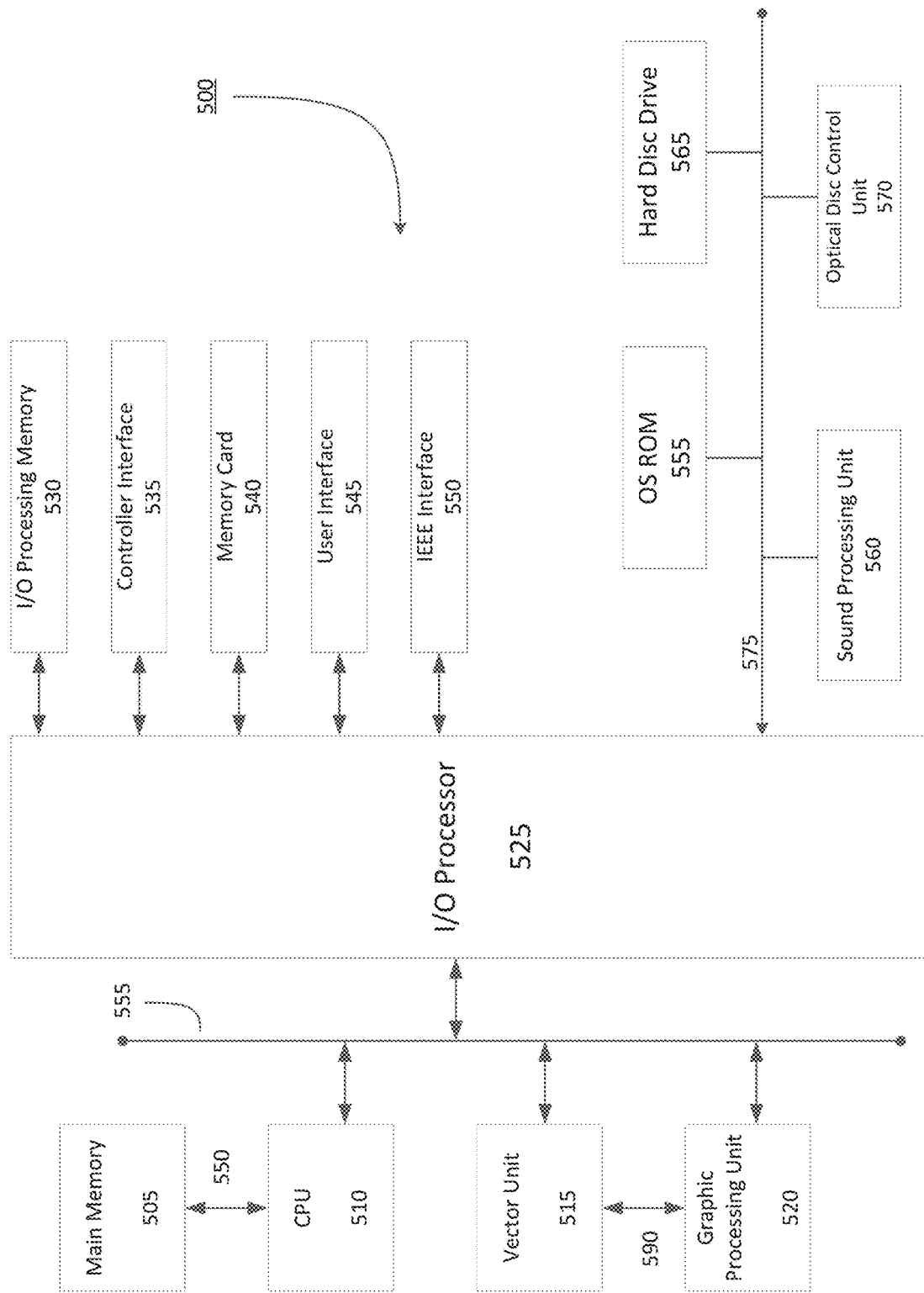
FIG. 5 is a block diagram of an exemplary electronic entertainment system that may be used in embodiments of the present invention.

FIG. 5 is a block diagram of an exemplary electronic entertainment system 500. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 555. Further, the CPU 510 of FIG. 5 communicates with the main memory 505 via a dedicated bus 550, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for gaze-based generation of virtual effects indicators correlated with directional sounds, the method comprising:

monitoring a current gameplay session over a communication network, wherein a client device of a player is playing an interactive content title associated with a three-dimensional virtual environment during the current gameplay session;

determining that the player is associated with an orientation within the three-dimensional virtual environment;

determining a player field of vision that includes one or more three-dimensional coordinates of the three-dimensional virtual environment based on the determined orientation, wherein one or more other three-dimensional coordinates associated with the three-dimensional virtual environment are excluded from the player field of vision;

identifying that gameplay data associated with the current gameplay session indicates a directional sound associated with a source location within the three-dimensional virtual environment of the interactive content title;

identifying that the source location corresponds to one or more of the other three-dimensional coordinates excluded from the player field of vision; and generating a virtual effect indicator to present within a display of the client device, wherein the virtual effect indicator visually indicates the source location of the indicated directional sound.

2. The method of claim 1, wherein the virtual effect indicator includes at least one of a visual doppler effect centered around the source location of the directional sound on the display, a written cue indicating which direction to look toward the source location, a visual indicating pointing to the source location of the directional sound or a direction of the directional sound, and a notification alerting the player to the source location of the directional sound.

3. The method of claim 1, further comprising:
tracking player gaze data via a camera during the current gameplay session;
identifying a location of a point of focus indicated by the tracked player gaze data within the three-dimensional virtual environment; and
mapping the player gaze data as the point of focus moves to different locations in the three-dimensional virtual environment.

4. The method of claim 3, further comprising identifying that the point of focus indicated by the gaze data does not move towards the source location within the three-dimensional virtual environment based on the mapped gaze data.

5. The method of claim 4, wherein identifying that the point of focus indicated by the gaze data does not move towards the source location within the three-dimensional virtual environment further includes comparing one or more three-dimensional coordinates associated with the source location of the directional sound with one or more three-dimensional coordinates associated with the identified point of focus.

6. The method of claim 4, wherein identifying that the point of focus indicated by the gaze data does not move towards the source location includes identifying that a portion of the gaze data sharing a same set of timestamps as an identified trigger point does not match a location on a display in which the directional sound is coming from.

7. The method of claim 1, further comprising:
tracking a plurality of mismatches associated with the player, each mismatch being between a respective point of focus and a respective source location of a respective directional sound; and
determining a correction angle based on a determined offset between the respective points of focus and the respective source locations, wherein the determined offset indicates hearing loss in one ear whereby the correction angle corrects for one-sided hearing.

8. A system for gaze-based generation of virtual effects indicators correlated with directional sounds, the system comprising:
a communication interface that receives monitored data regarding a current gameplay session sent over a communication network, wherein a client device of a player is playing an interactive content title associated with a three-dimensional virtual environment during the current gameplay session; and
a processor that executes instructions stored in memory, wherein the processor executes the instructions to:
determine that the player is associated with an orientation within the three-dimensional virtual environment;
determine a player field of vision that includes one or more three-dimensional coordinates of the three-dimensional virtual environment based on the determined orientation, wherein one or more other three-dimensional coordinates associated with the three-dimensional virtual environment are excluded from the player field of vision;
identify that gameplay data associated with the current gameplay session indicates a directional sound associated with a source location within the three-dimensional virtual environment of the interactive content title;
identify that the source location corresponds to one or more of the other three-dimensional coordinates excluded from the player field of vision; and
generate a virtual effect indicator to present within a display of the client device, wherein the virtual effect indicator visually indicates the source location of the indicated directional sound.

9. The system of claim 8, wherein the virtual effect indicator includes at least one of a visual doppler effect centered around the source location of the directional sound on the display, a written cue indicating which direction to look toward the source location, a visual indicating pointing to the source location of the directional sound or a direction of the directional sound, or a notification alerting the player to the source location of the directional sound.

10. The system of claim 8, wherein the processor executes further instructions to:
track player gaze data via a camera during the current gameplay session;
identify a location of a point of focus indicated by the tracked player gaze data within the three-dimensional virtual environment; and
map the player gaze data as the point of focus moves to different locations in the three-dimensional virtual environment.

11. The system of claim 10, wherein the processor executes further instructions to identify that the point of focus indicated by the gaze data does not move towards the source location within the three-dimensional virtual environment based on the mapped gaze data.

12. The system of claim 11, wherein identifying that the point of focus indicated by the gaze data does not move towards the source location within the three-dimensional virtual environment further includes comparing one or more three-dimensional coordinates associated with the source location of the directional sound with one or more three-dimensional coordinates associated with the identified point of focus.

13. The system of claim 11, wherein the processor identifies that the point of focus indicated by the gaze data does not move towards the source location by identifying that a portion of the gaze data sharing a same set of timestamps as an identified trigger point does not match a location on a display in which the directional sound is coming from.

14. The system of claim 8, wherein the processor executes further instructions to:
track a plurality of mismatches associated with the player, each mismatch being between a respective point of focus and a respective source location of a respective directional sound; and
determine a correction angle based on a determined offset between the respective points of focus and the respective source locations, wherein the determined offset indicates hearing loss in one ear whereby the correction angle corrects for one-sided hearing.

15. A non-transitory computer-readable stored medium having instructions embodied thereon, the instructions executable by a computing system to perform a method for gaze-based generation of virtual effects indicators correlated with directional sounds, the method comprising:

monitoring a current gameplay session over a communication network, wherein a client device of a player is playing an interactive content title associated with a three-dimensional virtual environment during the current gameplay session;

determining that the player is associated with an orientation within the three-dimensional virtual environment;

determining a player field of vision that includes one or more three-dimensional coordinates of the three-dimensional virtual environment based on the determined orientation, wherein one or more other three-dimensional coordinates associated with the three-dimensional virtual environment are excluded from the player field of vision;

identifying that gameplay data associated with the current gameplay session indicates a directional sound associated with a source location within the three-dimensional virtual environment of the interactive content title;

identifying that the source location corresponds to one or more of the other three-dimensional coordinates excluded from the player field of vision; and generating a virtual effect indicator to present within a display of the client device, wherein the virtual effect indicator visually indicates the source location of the indicated directional sound.

16. The non-transitory computer-readable medium of claim 15, wherein the virtual effect indicator includes at least one of a visual doppler effect centered around the source location of the directional sound on the display, a written cue indicating which direction to look toward the source location, a visual indicating pointing to the source location of the directional sound or a direction of the directional sound, or a notification alerting the player to the source location of the directional sound.

17. The non-transitory computer-readable medium of claim 15, further comprising instructions executable to:

track player gaze data via a camera during the current gameplay session;

identify a location of a point of focus indicated by the tracked player gaze data within the three-dimensional virtual environment; and map the player gaze data as the point of focus moves to different locations in the three-dimensional virtual environment.

18. The non-transitory computer-readable medium of claim 17, further comprising instructions executable to identify that the point of focus indicated by the gaze data does not move towards the source location within the three-dimensional virtual environment based on the mapped gaze data.

19. The non-transitory computer-readable medium of claim 18, wherein identifying that the point of focus indicated by the gaze data does not move towards the source location within the three-dimensional virtual environment further includes comparing one or more three-dimensional coordinates associated with the source location of the directional sound with one or more three-dimensional coordinates associated with the identified point of focus.

20. The non-transitory computer-readable medium of claim 18, wherein identifying that the point of focus indicated by the gaze data does not move towards the source location includes identifying that a portion of the gaze data sharing a same set of timestamps as an identified trigger point does not match a location on a display in which the directional sound is coming from.

21. The non-transitory computer-readable medium of claim 15, further comprising instructions executable to:

track a plurality of mismatches associated with the player, each mismatch being between a respective point of focus and a respective source location of a respective directional sound; and determine a correction angle based on a determined offset between the respective points of focus and the respective source locations, wherein the determined offset indicates hearing loss in one ear whereby the correction angle corrects for one-sided hearing.

* * * * *